United States Patent [19]

Reynolds

[11] Patent Number: 5,012,645

[45] Date of Patent: May 7, 1991

[54] COMBUSTOR LINER CONSTRUCTION FOR GAS TURBINE ENGINE

[75] Inventor: Harold G. Reynolds, West Palm Beach, Fla.

[73] Assignee: United Technologies Corporation, Hartford, Conn.

[21] Appl. No.: 81,083

[22] Filed: Aug. 3, 1987

[51] Int. Cl.[5] .......... F02C 1/00

[52] U.S. Cl. .......... 60/754; 60/756

[58] Field of Search .......... 60/754, 755, 756, 758, 60/760

[56] References Cited

U.S. PATENT DOCUMENTS

| | | | |
|---|---|---|---|
| 3,570,241 | 3/1971 | Alexander | 60/757 |
| 3,854,285 | 12/1974 | Stenger et al. | 60/39.66 |
| 3,990,232 | 11/1976 | Campbell | 60/39.66 |
| 4,109,459 | 8/1978 | Ekstedt et al. | 60/757 |
| 4,302,941 | 12/1981 | DuBell | 60/757 |
| 4,480,436 | 11/1984 | Maclin | 60/757 |
| 4,567,730 | 2/1986 | Scott | 60/757 |

*Primary Examiner*—Louis J. Casaregola
*Assistant Examiner*—T. S. Thorpe
*Attorney, Agent, or Firm*—Edward L. Kochey, Jr.

[57] ABSTRACT

Floating panel heat shields 26 cover the walls of a combustor with a portion of the cooling air 32 passing upstream. The dome heat shield 36 has a lip 42 overlapping a portion of the wall hot shield 26. Dome 16 at location 44 deflects cooling flow 32 forcing it inwardly against lip 42 to improve cooling of lip 42.

2 Claims, 1 Drawing Sheet

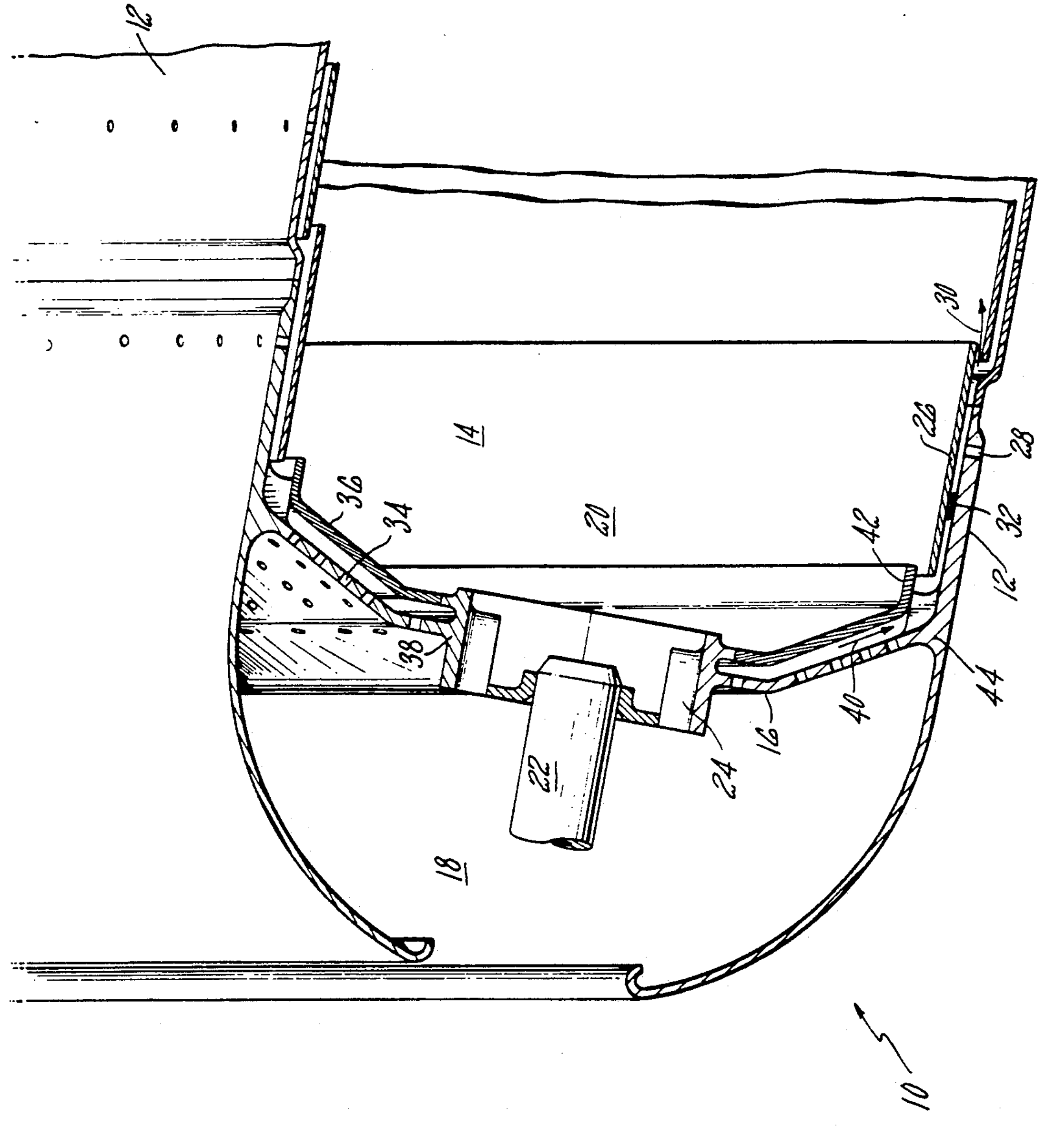
12
30
14
26
28
36
34
20
42
32
12
38
44
40
16
24
22
18
10

COMBUSTOR LINER CONSTRUCTION FOR GAS TURBINE ENGINE

The Government has rights in this invention awarded by the Department of the Navy.

DESCRIPTION

1. Technical Field

The invention relates to gas turbine engines and in particular to a combustor liner arrangement therefor.

The combustor of a gas turbine engine is required to burn fuel in a minimum volume. This places substantial heat load on the surrounding structure. This dictates that special consideration be given to this structure which usually results in heat shields protecting the walls with the heat shields being air cooled. Still, excess temperatures at various locations can occur leading to oxidation, cracking, and high thermal stresses of the heat shields themselves.

Impingement and convective cooling of floating wall panels of the combustor wall itself is known from U.S. Pat. No. 4,302,941. Impingement and convective cooling of a shield located adjacent to the dome is also known. The outer edge of such a dome shield tends to have high temperature problems. The convective flow passing along the dome wall itself must turn at this location to pass parallel to the combustor walls, thereby tending to detach itself from the surface to be cooled. The air is also at maximum temperature and impingement cooling is not readily available.

2. Disclosure of the Invention

A combustor for a gas turbine has floating panels covering the walls of the combustor with a portion of the impingement and convective cooling air passing upstream. The dome of the combustor has airflow holes therethrough cooling a dome shield located on the combustion chamber side thereof with the cooling air passing outwardly toward the combustor walls. At the wall of the combustor the dome heat shield overlaps in closely spaced relationship panels of the wall heat shield. The cooling air behind the panels is blocked so that it passes inwardly to impinge against the edge of the dome heat shield, this edge being the lip which is prone to crack and oxidize because of excessive heating.

BRIEF DESCRIPTION OF THE DRAWING

The Figure is a sectional elevation showing the heat shields and in particular the interface between the wall heat shields and the dome heat shield.

BEST MODE FOR CARRYING OUT THE INVENTION

In a gas turbine engine a combustor 10 has a combustor wall 12 defining a combustor volume 14. A dome 16 divides combustor volume into an air inlet plenum 18 and a combustion chamber 20.

A fuel injector 22 injects fuel into the combustion chamber where it burns along with combustion supporting air passing through airflow opening 24. This combustion tends to impose intense radiation and convection against the combustor wall 12 and the dome 16. Accordingly, various heat shield panels are used.

Supported on the combustor wall 12 are a plurality of heat shields 26 each of these being cooled by an airflow passing through opening 28 with the airflow impinging against the heat shield and a portion 30 passing in the downstream direction passing in the second portion 32 passing in an upstream direction. A plurality of the holes 28 are located throughout the area to adequately cool the panel. The dome has a plurality of holes 34 located therein to supply impingement cooling air from air plenum 18 against the heat shield 36 which is closely spaced from the dome and centrally supported only from the dome at cylindrical member 38.

The cooling air introduced through openings 34 continues outwardly in the direction shown by arrow 40 thereby supplying convective cooling as well as impingement cooling of the dome heat shield 36.

The heat shield 36 has an outer portion or lip 42 closely spaced from and overlapping a portion of the wall heat shield 26. It is this portion of the dome heat shield which is most vulnerable since the cooling air 40 tends to move away from the surface. Dome 16 at location 44 blocks the airflow 32 forcing it inwardly against lip 42 thereby providing additional cooling of this lip. Accordingly, the dome is adequately cooled without complex structure which could result in an increased thickness at area 44 which in turn would lead to thermal stresses during transients.

There is accordingly an appropriate combination of cooling airflow paths which adequately cool the vulnerable outer lip of the dome heat shield.

I claim:

1. In a gas turbine combustor having a combustor wall defining a combustor volume, a dome dividing said combustor volume into an air inlet plenum and a combustion chamber, heat shield panels closely space inwardly of said combustor wall forming a wall airflow path between the heat shield panels and the combustor wall, and means for introducing air to said airflow path with at least a portion of the air flowing through said wall airflow paths toward said dome, the improvement comprising:

a dome heat shield closely spaced inwardly toward said combustion chamber and parallel to said dome, forming a dome airflow path therebetween;

said dome having a plurality of holes therethrough to pass dome cooling air against said dome heat shield and through said dome airflow path;

said dome heat shield having an outer portion closely spaced from and overlapping the portion of said wall heat shield closest to said dome;

said wall airflow path extending to and blocked by said dome, but in fluid communication with said dome airflow path at a location immediately upstream of said outer portion of said dome shield whereby said portion of wall airflow reverses direction, joining with said dome airflow and forces said airflow against said outer portion of said dome heat shield improving the cooling thereof.

2. An apparatus as in claim 1:

said dome heat shield secured only to said dome at a location remote from said combustor wall.

* * * * *